June 27, 1967　　　　R. E. WEBER　　　　3,328,184
PRINTING PAPER HAVING OPAQUE CELLULAR COATING AND
METHOD AND COMPOSITION FOR FORMING THE SAME
Filed July 2, 1963　　　　　　　　　　　3 Sheets-Sheet 3

United States Patent Office 3,328,184
Patented June 27, 1967

3,328,184
PRINTING PAPER HAVING OPAQUE CELLULAR COATING AND METHOD AND COMPOSITION FOR FORMING THE SAME
Robert E. Weber, Neenah, Wis., assignor to Kimberly-Clark Corporation, Neenah, Wis., a corporation of Delaware
Filed July 2, 1963, Ser. No. 292,494
11 Claims. (Cl. 106—130)

This application is a continuation-in-part of my copending application Ser. No. 254,965 filed Jan. 30, 1963, now abandoned, and assigned to the same assignee as the present invention.

This invention relates to improvements in paper coating compositions, to paper coated with such compositions, and to methods of producing the coating compositions and coated paper.

In my said copending application I have described a coating composition of the oil-in-water type having a nongelling starch as a primary component. The emulsifying agent of that application is selected to be one which does not form a channel complex with starch. As noted in the prior application, emulsifying agents which form a channel complex with the starch not only require large quantities of conventional emulsifier—such as soap, oleic acid or salts thereof to form the emulsion, but the resulting composition is inferior as to adhesive strength. The emulsifying agents which have been found to serve the purpose of effecting emulsification while providing good letterpress pick resistance are described in my copending application and have a blocking group, that is, a side chain which inhibits the undesirable action of the starch and emulsifying agent.

In the said copending application I have also described the inclusion of a small quantity of protein up to about 10% of the total weight of the binder (starch plus protein) as useful in developing brightness in the final treated coating. Additionally, I have noted in this former application that high shear, as in a Kady mill, is useful in developing some additional brightness whether or not the protein is present as a portion of the binder.

I have now discovered that high shear or the imparting to the emulsion system of considerable energy through a vigorous emulsification process permits the emulsifying agent as such to be eliminated in a composition which contains the starch and protein. In order to achieve this, certain precautions must be taken. A pertinent condition is that the agitation or high shear must be such as to provide essentially all of the oil present in the form of fine droplets having a diameter of between about 0.5 to 2.5 microns, 3.5 microns being an upper limit. Preferably the droplets are in the range of about 0.5 to 1.5 microns. By essentially all I contemplate that 95% or more of the oil must be in the form of such fine droplets below 2.5 microns and generally 99% of the oil is below 2.5 microns. Under this condition the relatively globular protein molecule, which itself has hydrophobic and hydrophilic qualities as well as side chain blocking groups, is of sufficient stability to serve as a binder, as a brightening agent and as the emulsifier. The side chain carrying protein molecule apparently acts to prevent the formation of the undesired channel complex; that is, the protein molecule inhibits the coiling of the straight chain portion of the starch about the protein. While I have referred to the protein molecule as "globular," it is generally considered to consist of chainlike compounds united through the peptide linkage and to have a formula such as:

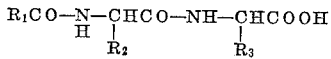

where $R_1$ may be the hydrophobic portion; the COOH group the hydrophilic portion; and $R_2$ and $R_3$ branch chains which may include the groups such as

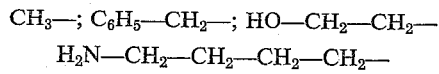

and others. These latter groups apparently serve as blocking groups to prevent the formation of a channel complex between the starch and protein.

The proteinaceous materials which have been found useful for the purpose include soy protein, casein, animal glue, and soluble blood protein, for example. Low viscosity soy protein is preferred but the so-called high viscosity protein materials are also equally useful. The quantity of protein required for the purposes of enclosing the small oil droplets to beneficially separate the aqueous phase from the water-immiscible oil and to serve as the binder and brightener for letterpress printing papers need not generally be significantly greater than as described in my copending application. This is apparently because the protein, upon evaporation of the oil and water, tends to more uniformly coat or form the walls of the voids or cells remaining after evaporation and is thus in the final product distributed in the dry coating composition quite differently than in my copending application where it is quite thoroughly intermixed with the starch as the binder component, and only is present in the cell's walls to a minor degree. In the present instance the protein, while serving the essential function of an emulsifying agent, also provides for bonding pigment and starch particles adjacent the cell walls and thus provides a firm cell structure. In my copending application the selected emulsifying agent preferentially exerts the emulsifying action. Thus, by the practice of the present invention, the necessity for a separate emulsifying agent serving only as an emulsifying agent is eliminated. Further, the cost of the composition is thereby reduced.

I have found that the quantity of proteinaceous material, while it must be sufficient to enclose the oil droplets, must not be present to an extent that letterpress pick resistance becomes unacceptable. This protein quantity may vary somewhat with the specific protein but, in general, is preferably in the range of 5% to 10% by weight of the total binder; and the emulsion is desirably of such fineness that approximately this quantity of protein may be employed while achieving the ultimated desired opacity in the coating upon evaporation of the oil. However, in some instances, that is, at a high binder to pigment ratio, a low total solids and a high oil volume, the protein proportion may be somewhat greater. I have found that about 15% by weight of protein on the binder is useful in such compositions. It appears that the protein, in accordance with this invention, is essentially concentrated at the interface of the aqueous and oil phases and the aqueous phase is otherwise substantially free of protein. The protein then being bound up as the emulsifying agent does not deleteriously affect the adhesive capacity of the binder.

The emulsion droplet size is determined by photographing films of the emulsion coating composition cast on glass plates. The magnification is suitably about 1600×. The droplets are then measurable on the photograph and are seen to be of a spherical contour before drying. Accordingly, in general I consider the appropriate term to indicate droplet size to be the droplet diameter.

The composition of this invention does permit the utilization of emulsifying agents such as those described in my copending application, and such emulsifying agents may be beneficially employed in small quantity as they also tend to add brightness and, in some respects, to provide a better and more easily formed emulsion system.

However, they are not necessary to the practice of this invention.

The very considerable mixing action required to secure the emulsification of the oil in the aqueous pigmented starch dispersion may be achieved in a variety of equipment types. One such is the well-known Kady mill. Another is the sonic mixer such as is described in U.S. Patent No. Reissue 25,324 of Jan. 29, 1963. In any event, the agitation must be sufficient to provide essentially all of the oil in the noted range. Utilizing units of shearing stress as a measure of such agitation, I have found that, depending upon composition viscosity, the stress must be between about 750,000 to 7,500,000 dynes per square centimeter.

Essential to the formation of a useful coating composition of the emulsion type, however, is the presence of a pigment content; a composition viscosity in the range of about 3,000 to 18,000 or more centipoises as measured with a Brookfield viscometer at 100 r.p.m. with a No. 6 or 7 spindle at 40° C.; an oil content formed into the noted small droplet size and which is so limited with relationship to the total solids of the composition that the resultant dried coating is hard—hard enough to be moderately supercalendered without destruction of the multiplicity of voids resulting from the oil evaporation. For letterpress printing I have found the requirements of the coating composition when the oil droplet size is between about 0.5 and 2.5 microns to be relatively critical. An imbalance between the quantity of binder, the quantity of pigment, and the quantity of oil results in poor coating composition for letterpress purposes. This is apparently because, if the binder level is low relative to the other components, the letterpress pick resistance decreases sharply and the coated paper is essentially useless for letterpress printing purposes. On the contrary, if the binder content is too high, drying of the coating composition is not readily effected since the binder tends to retain the water of the aqueous phase and the porosity in the coating provided by the relatively low pigment content is insufficient to permit rapid expulsion of that water which is freed by the drying step. In fact, blistering may occur if suitable precautions in respect to binder composition and drying conditions are not observed.

By the essentially nongelling starch I mean a starch which provides either a very soft gel structure or which does not gel. Starch materials which serve the purpose include modified starches such as hydroxyethylated starches, acetate starches, root starches such as tapioca starch, oxidized starches and the like. Raw cornstarch, for example, is unsuitable. In essence, emulsions which form hard gelling starches tend to break too soon, that is, before application of the web, while other of intermediate hardness break when applied to the web. A starch of soft gel structure having a degree of mobility and low yield value is satisfactory.

The water content of the compositions of this invention may vary within reasonable limits without materially affecting drying and while achieving adequate coating holdout. This latter factor is important as it leads to good printability. In general, the water to binder (starch plus protein since the protein also binds particles adjacent the cell walls) ratio is between about 2.5:1 to 4:1 by weight. Larger proportions of water may be employed but usually lead to viscosity and solids reduction to an undesirable extent.

With respect to drying of the composition on the web, I have found that the drying temperatures vary somewhat with the specific nature of the drying equipment. Thus, drying is effected more readily in a hot air blast than with the usual drying drums. At a paper speed of about 1500 f.p.m. I have adequately dried coatings within one second at temperatures of 200° to 350° F. utilizing an air blast directed onto the traveling web. However, if the pigment to binder ratio is low, the drying time may increase slightly; the specific nature of the oil phase also effects drying temperature and time since the oil must be flashed off and flashed off after substantially all of the water is eliminated. The drying conditions must, of course, be such that the proteinaceous material forming the emulsifying agent remains stable as it forms a constituent of the final coating.

The invention will be more fully understood by reference to the following detailed specific examples and the accompanying drawings wherein.

Figure 1:
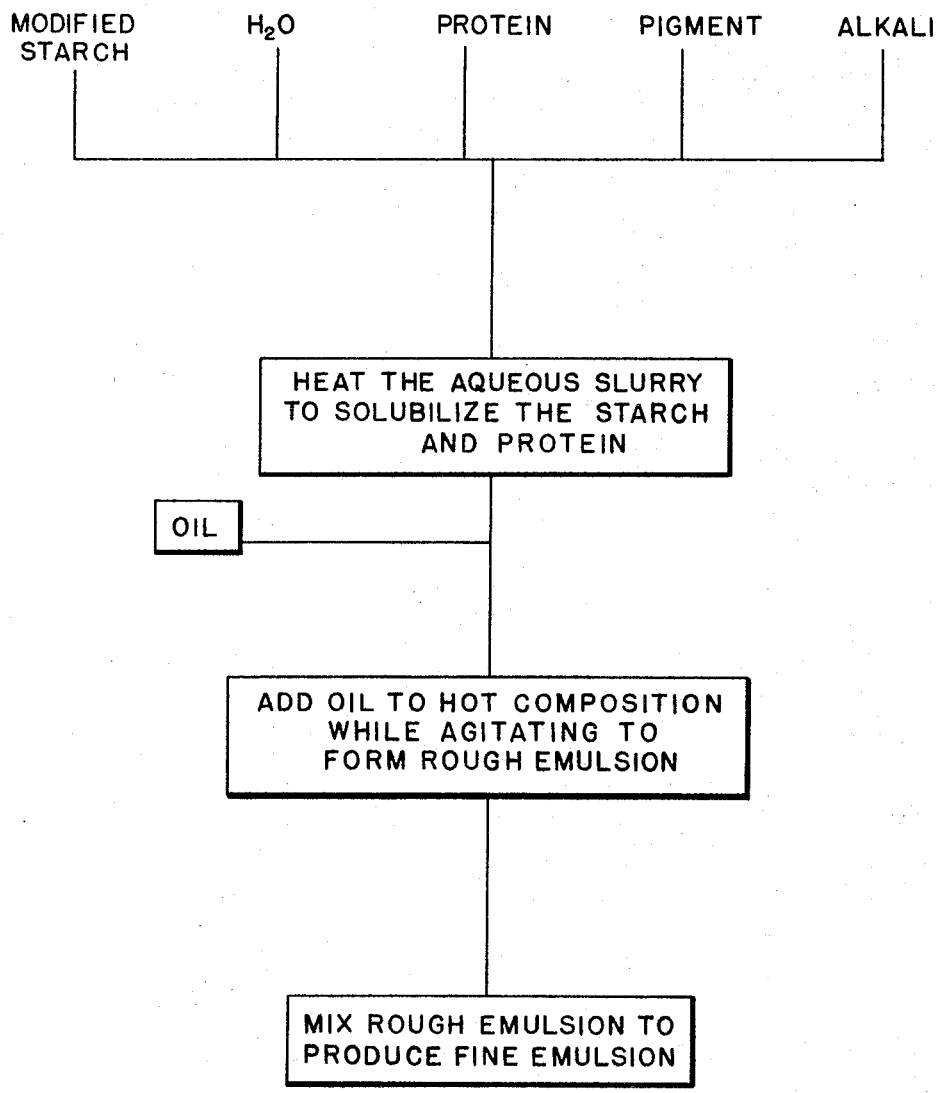
FIG. 1 is a flow chart illustrating the preferred practice of the present invention.

In FIG. 1 the preferred embodiment of the process of the invention is illustrated. As will be noted, the coating composition components may be slurried in substantially any desired order and then heated. The components are themselves conventional printing paper coating composition materials. A rough emulsion is formed while adding the oil, the addition preferably being made while the composition is hot. While the composition may be cooled before oil addition, such leads to excessive power requirements in emulsion formation or the necessity of reheating to facilitate the making of the emulsion. Since the energy input is usually high—when a Kady mill is utilized having a shearing disc diameter of 5 inches and a spacing of 0.64 inch at 6,000 r.p.m. and with a 25 H.P. motor effecting the drive—it is desirable and economical to emulsify at a temperature of about 150° F.

Figure 2:
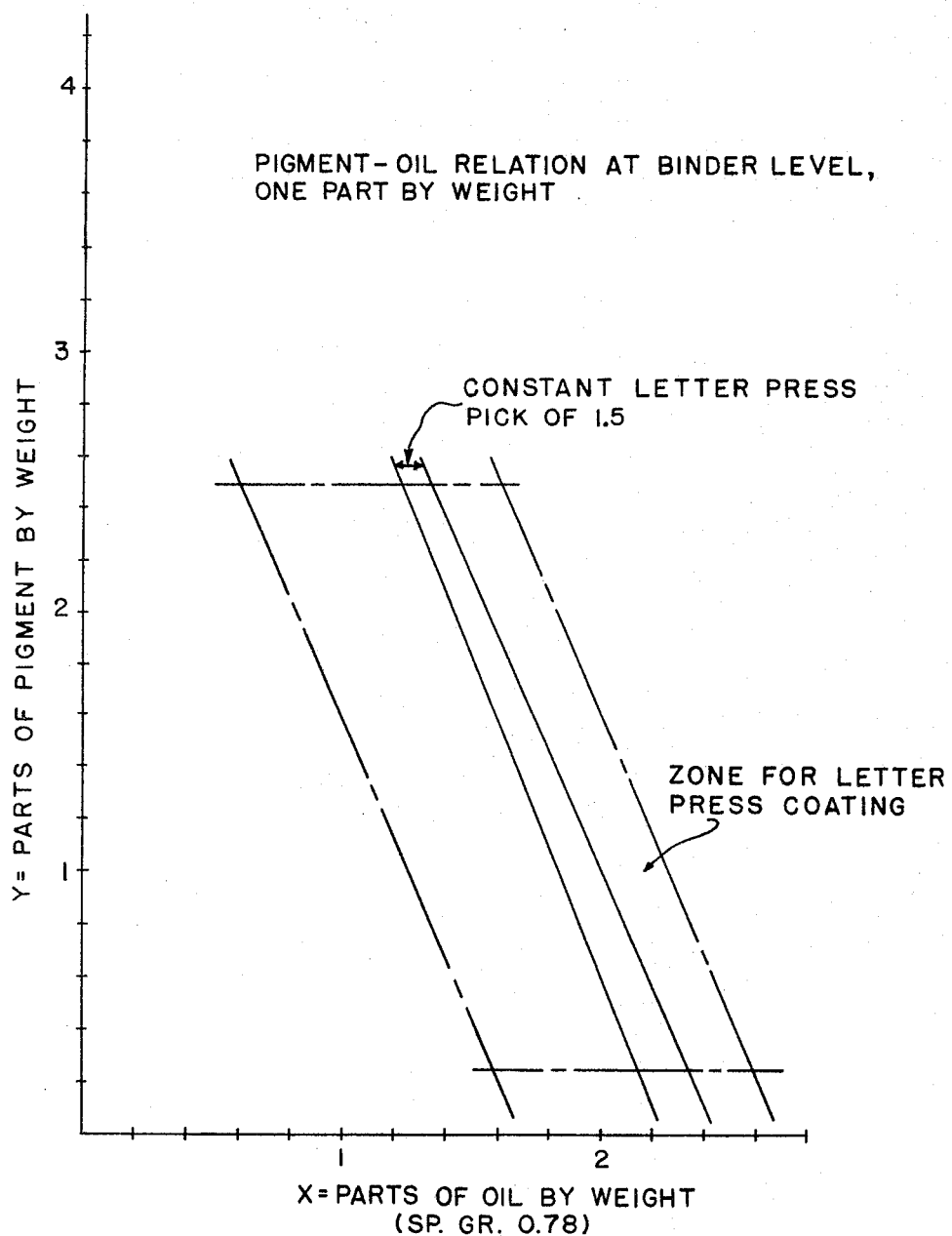
FIG. 2 is a graph indicating acceptable proportions of oil and pigment in the aqueous emulsion coating composition, the graph being based on a constant binder level and the protein for this purpose being considered together with the starch as a portion of the binder.

The chart of FIG. 2 illustrates a range of coating compositions found of particular utility in the preparation of coated paper for letterpress printing where high pick resistance is a prime requirement. The chart is based on a unit weight of dry binder (starch plus protein at a protein percentage of 10% by weight) and compares the ranges of pigment and oil in oil-in-water emulsions which are effectively employed to produce a high grade coated letterpress printing paper. As shown in FIG. 2, the prescribed zone for relative weights of components for letterpress coating compositions containing starch and protein, pigment, oil and water is a relatively restricted one. This zone is bounded by long and short dash lines. That portion of the zone which shows within the solid lines identifies coating compositions which exhibit a constant letterpress pick resistance of at least 1.5. The rightward solid line of this latter area (FIG. 2) is achieved when the emulsion oil droplet size is between about 0.5 and 2.5 microns. The leftward solid line indicates compositions in which the emulsion size is required to be between about 0.5 and 1.5 for the attainment of the noted pick resistance. Compositions falling within the noted zone, long and short dash lines, are also suitable for rotogravure printing though, in general, the pick resistance requirement is materially lower for such coatings and, accordingly, the binder is not as critical a factor.

The opacity provided on paper webs by all compositions within the specified zone is also high. However, I have found that pick resistance increases as the oil content decreases while opacity decreases as the oil content decreases. It is also to be noted that for a given oil content (and binder content) the pick resistance decreases with increasing pigment content. Nevertheless, some pigment is required to achieve adequate drying of the composition on the web. In the specific examples set out hereinafter, the compositions fall within the limits defined in the graph for letterpress paper coating compositions, Examples 5 and 6 being illustrative of more limiting conditions. Such compositions are also suitable for rotogravure coatings but are relatively expensive for this purpose. In general, The table set out below summarizes pertinent characteristics of the coatings of the examples.

TABLE

|  | Example | | | | | | |
|---|---|---|---|---|---|---|---|
|  | 1 | 2 | 3 | 4 | 5 | 6 | 7 |
| Brightness (G.E.) | 72.5 | 73 | 72.5 | 71 | 72 | 70 | 70 |
| Opacity (Bausch & Lomb) | 91 | 92 | 91 | 90 | 91 | 90 | 90 |
| Gloss | 50 | 50 | 48 | 52 | 45 | 50 | 50 |
| L/P Pick resistance | 1.0 | 1.0 | 1.0 | 1.0 | 1.0 | 1.5 | 1.0 |
| Shearing Stress (in millions of dynes/cm.²) | 2.5 | 7.4 | 2.5 | 1.7 | 2.0 | 2.5 | .74 |
| Percent Solids | 30.5 |  | 30.4 | 30 | 20.4 | 44 | 27.4 |
| Viscosity, cps | 10,000 |  | 11,500 | 7,500 | 8,000 | 8,000 | 3,000 |
| Droplet size (in microns) | 0.5-2.5 | 0.5-1.5 | 0.5-2.5 | 1.5-2.5 | 0.5-2.5 | 0.5-2.5 | 0.5-3.5 | rotogravure compositions fall in the higher oil content range, that is, to the right of the upper limiting oil condition for letterpress compositions.

The graph (FIG. 2) very generally may be described by the following formula based on a unit binder weight (starch plus protein): $2.32x+y=z$; where $y=$ the weight units of pigment having a value between 0.25 and 2.5; $z=$ a variable of the equation having limits of about 3.8 to 6.2 and $x=$ the weight units of the water-immiscible fluid (oil of specific gravity of 0.78) and is dependent on the values chosen for $y$ and $z$. The foregoing approximate equation must be adjusted if an oil of differing specific gravity is employed, for it is obviously volume considerations which are important in the development of the open cell structure which gives rise to opacity in the dry coating. However, it is customary in the art to refer to such compositions in weight units since such are more readily employed in batch production of compositions in the mill and laboratory. In the following examples the components, as is customary in the art, are set forth on a weight basis. However, in these compositions volume becomes a factor in order to attain adequate web coverage. The specific volume of the components employed is: (a) 0.376 cc./gram for the clay pigment; (b) 0.617 cc./gram for the hydroxyethylated starch; (c) 0.720 cc./gram for the soy protein; and (d) 1.28 cc./gram for the oil.

It will be appreciated that other specific components may be substituted for those illustrated. For example, $TiO_2$ may be employed as the pigment but increases the coating weight without addition of bulk. Bulk is desirable to aid handling and printability.

Figure 3:
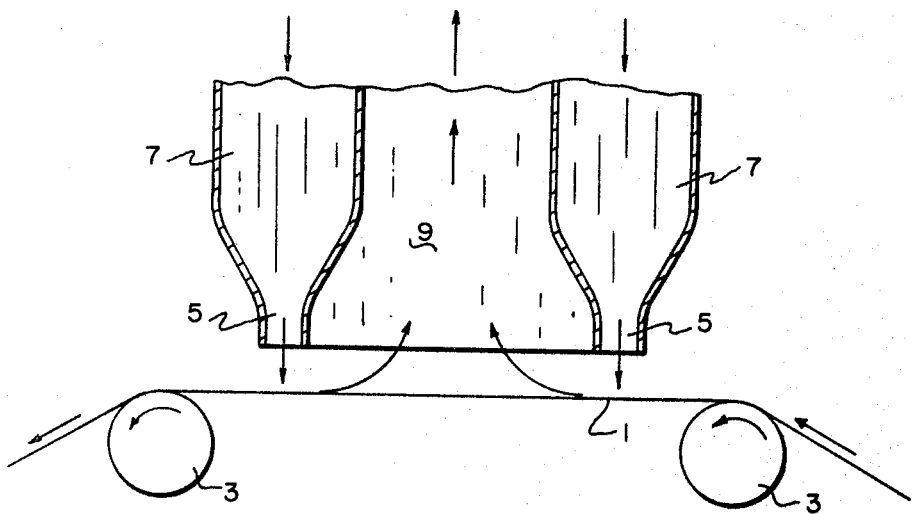
FIG. 3 illustrates the preferred mode of drying the coating compositions of the invention.

In FIG. 3 one form of drier useful in the practice of the invention is illustrated. As shown, a freshly coated paper web 1 is carried on rolls 3 beneath a high velocity air drier. The drier includes nozzles 5 in conduits 7 through which air at high temperature is forced to impinge on the traveling web 1. The impinging heated air causes first expulsion of water and then of oil from the coated web. With oils which exert a vapor pressure lower than but close to that of water, some small amount of oil may be evaporated with the water. In essence, however, with kerosene, xylene, #1 and #2 fuel oils, substantially all of the water evaporates before a significant amount of oil is driven off. The oil in the somewhat hardened coating then evaporates, forming cells, voids or the like. The oil and water pass outwardly through channels as at 9 under influence of the vacuum pressure applied thereto. By this means the unsupported traveling web is very quickly dried and contains a multiplicity of pores, etc. which give rise to the desired opacity.

Figure 4:
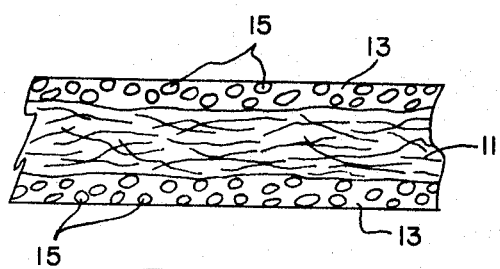
FIG. 4 is a schematic fragmentary enlarged view and illustrative of the coating composition applied to both sides of a web and dried thereon.

The dry coated web is illustrated in FIG. 4; the numeral 11 denotes the web, 13 the coating on opposed sides, and 15 indicates the cell structure.

In the following examples the application of various coating compositions to a light weight web are illustrated.

In the tabulation: the gloss value is the percentage of specularly reflected light reflected at an angle equal to the angle of incidence employing a black glass as a standard, the angle of incidence being 75° and the area measured ¼″ x ¾″; the higher the numerical value, the greater the gloss. Brightness is measured with a G.E. brightness tester common to the art; higher values indicate higher brightness. Opacity is measured with the standard Bausch and Lomb opacimeter, the larger values indicating greater opacity. Letterpress half-tone is a print test and is a measure of the papers' ability to reproduce 120 line screen with a 50% etch, the lower the numerical value the more suitable the paper for half-tone printing, the range normally running from 1 to 10. The letterpress pick test is also a print test which involves printing of a solid band of ink on the sheet under controlled conditions; the magnitude of pick or rupture during printing is graded against standard prints to attain a numerical value and the lower the numerical value, the more pick resistant is the sheet and the more suitable is the sheet for letterpress printing.

The paper web to which the coatings are applied in the following example is unsized. For light weight basis papers such is preferred although conventional sized sheets may be used.

Also, in all instances the times of fine emulsion formation from the rough emulsion is the same since the rates of passage through the Kady mill for each composition employed are essentially identical.

A coating composition suitable for commercial use in the production of letterpress coatings for paper was made by first combining the following components at room temperature.

*Example 1*

Parts by weight
Starch—hydroxyethylated, medium viscosity ____ 180
Papermaker's coating clay (predispersed) _____ 200
Protein—low viscosity soy _____ 18.5
Water _____ 600
Aqueous ammonia solution (assay 29.1% ammonia) _____ 5

This composition was slurried, cooked in an open vessel at about 190° F. for 20 minutes and oil (Stoddard solvent) to the extent of 312 parts by weight was added to the slurry while it was at about 175° F. An initial crude dispersion of the oil in the slurry was formed by stirring with a Lightnin mixer as the oil was added. The coating was then pumped up to the coating room where it was passed through a Kady mill to form a fine emulsion. The rate at which this coating was pumped through the Kady mill was 10 gallons per minute. The shearing stress developed in the Kady mill was approximately 2,500,000 dynes per square centimeter.

It is to be noted that in the course of the production of the emulsion, the addition of oil under the low shear of the mixer increased the cooked composition viscosity very considerably. However, it pumped well to the Kady mill. Under the influence of the high shear in the Kady mill, the viscosity increased further and remained high, requiring very considerable energy for the emulsion formation. This energy is considerably in excess of that required to form an emulsion of similar characteristics when a branch chain emulsifying agent such as is employed in my copending application is utilized. The viscosity of the resulting composition at 40° C. as measured on a Brookfield viscometer at 100 r.p.m. with a No. 7 spindle was 10,000 centipoises. The solids content of the composition was 30.5% by weight and the pH of the composition was 8.6. In the course of the oil addition, the oil which is itself at room temperature when added, causes the composition temperature to drop, and the temperature is further reduced by passage through the equipment. During the course of the emulsification, the net effect is a cooling one and the resulting composition has a temperature of about 140–150° F., which is suitable for direct application to a paper web.

It is to be noted that the emulsion contained oil droplets having a diameter of between about 0.5 to 2.5 microns, essentially all of the droplets falling within this range.

The foregoing composition was applied to a paper web which itself was formed of about 60% bleached sulfite pulp by weight and 40% bleached groundwood. This web had a basis weight (25" x 38" x 500 sheets) of 26 pounds. The web also had an opacity as measured on the Bausch and Lomb opacimeter of 86 and a G.E. brightness of 67.5. The coating was applied in excess and then troweled with a small diameter reversely rotating rod which smoothed and troweled the coating on to the web. Such a coating device is known commercially as a Champflex coater. The weight per side was about 3 pounds (dry basis) resulting in a 32-pound coated basis weight sheet. In the application of the coating, one side was coated first and then dried and the second side was then coated and dried. Drying took place in an air blast (FIG. 3) having a temperature of about 310° F. When the coating is first applied to the web, it lies on the web like any conventional pigment-binder coating composition of the paper-making field. The evolution of the oil does not of itself cause material shrinkage although water evaporation which occurs prior to the oil evaporation does contract the coating to some minor extent. This tends to aid hardening of the web, a most important factor for the unsupercalendered coated web is relatively dull and supercalendering is desirable in order to achieve an optimum surface condition. This supercalendering is effected at a coated sheet moisture content of about 1–4% under moderate pressures and raises the gloss of the coating. The finished coated web as shown in the table exhibited a G.E. brightness of 72.5, opacity (Bausch and Lomb) of 91, and a gloss of about 50. The letterpress pick resistance was excellent, having a value of 1 on a scale which normally runs from 1 to 10 and in which coating pick resistance of less than about 4 is commercially suitable.

*Example 2*

Example 1 was repeated except that the quantity of water was reduced from 600 parts by weight of 525 parts by weight. The emulsion formed had a viscosity of 30,000 centipoises at 40° C. as measured on a Brookfield viscometer at 100 r.p.m. with a No. 7 spindle. This emulsification required the expenditure of considerably more energy than that in Example 1 due to the materially higher viscosity of the formulation. The shearing stress developed in the Kady mill on the composition was approximately 7,400,000 dynes per square centimeter. The rate of flow through the Kady mill was 10 gallons per minute. The coating, after passing through the Kady mill, had essentially all oil droplets in a diameter range of 0.5 to 1.5 microns. This finer emulsion results from the higher shearing stress applied by the Kady mill. It should be noted that this high viscosity generally is too high for a commercial coating operation. It is, therefore, desirable to add water to this emulsion (which does not change the oil droplet size) to reduce the viscosity to a range of around 10,000 centipoises and the solids content is then about 30%. Under these conditions the coating will run well under coating conditions similar to that in Example 1. When 3 pounds of coating per side (dry basis) are applied to a 26-pound base as in Example 1, the finished sheet, after it has been supercalendered, will have (see table also) a brightness of approximately 73 and an opacity of 92 and a gloss of 50. This is a slightly higher brightness and opacity than in Example 1 and is due to the finer emulsion droplets obtained by the high shear conditions. The letterpress pick value is 1.

*Example 3*

The following illustrates the utilization of casein as the protein constituent of the coating composition. Initially a slurry was made containing:

Parts by weight
Starch—hydroxyethylated (10% moisture)_____ 200
Papermaker's coating clay (predispersed)_____ 200
Casein (7% moisture)_____ 20
Water _____ 600
Aqueous ammonia solution (assaying 21.9% ammonia) _____ 5

This slurry was heated to a temperature of about 180° F. for about 20 minutes to thoroughly solubilize the casein and starch and to provide a creamy white uniform composition. While at a temperature of about 180° F., 360 parts by weight of oil (Stoddard solvent) at room temperature were mixed into the composition with gentle agitation. This addition caused the temperature of the composition to drop to about 160° F. The composition was then pumped through a Kady mill at a rate of about 10 gallons per minute at a shearing stress of 2,500,000 dynase per square centimeter and the resulting emulsion had a viscosity of 11,500 centipoises at 40° C. as measured on a Brookfield viscometer at 100 r.p.m. with a No. 1 spindle. The pH o fthe composition was 8.8 and the solids content 30.4% by weight. The oil droplets of the emulsion were essentially all in the diameter range of 0.5 to 2.5 microns. This coating composition applied to the same web, dried, and lightly supercalendered, as described in Example 1, exhibited a G.E. brightness of 72.5, an opacity of 91, and a gloss of about 48, the gloss being on the same scale as in the preceding examples. The letterpress pick value was about 1.0.

*Example 4*

The following example illustrates the effect of using a lesser quantity of protein to serve as the emulsifying agent, binder and brightener. It will be noted that the composition formulated has a materially lower viscosity although primarily the only constituents changed from that of Example 1 are the protein quantity and the quantity of alkaline solubilizing agent for the protein.

The following slurry was formulated:

Parts by weight
Starch—hydroxyethylated, medium viscosity_____ 180
Papermaker's coating clay (predispersed)_____ 200
Protein—low viscosity soy_____ 9.3
Water _____ 600
Aqueous ammonia solution (assaying 29.1% ammonia) _____ 3

This slurry was heated at 190° F. for about 20 minutes and then the oil in the amount of 312 parts by weight added, the oil as in the preceding examples being at room temperature and the composition being at about 175°

F. The temperature was reduced by the oil addition which was made under light mixing conditions. The oil-containing composition in the form of a rough emulsion was then directed to the Kady mill and passed through the mill at a rate of about 10 gallons per minute. The resulting composition contained somewhat larger oil droplets than the composition of Example 1, the shearing stress in the Kady mill being about 1,700,000 dynes per square centimeter. The micron range of the oil droplets was between about 1.5 to 2.5, the composition viscosity 7500 centipoises as measured at 40° C. on the Brookfield viscometer at 100 r.p.m. using a No. 6 spindle. The composition pH was 8.8 and the solids content 30%. It is to be noted that the quantity of protein in this instance is about minimal for the purpose of completely enveloping the oil droplets and separating them from the aqueous phase. While the shear exerted is relatively high, the protein quantity is insufficient to permit very small oil droplet formation. Nevertheless, the composition is quite suitable for commercial purposes and, when applied to a web at the rate of 3 pounds (dry basis) as in the previous examples, the dry supercalendered web had a G.E. brightness of 71, an opacity (Bausch and Lomb) of 90, a gloss on the same scale as in the preceding examples of 52, and a letterpress pick resistance of 1.0.

*Example 5*

The following example illustrates the utilization of a composition which, when applied to the web at a relatively low weight, is effective to produce a very desirable commercial product. This composition has a relatively high proportion of protein based on the sum of the starch and protein weights. A slurry having the following components was formed.

| | Parts by weight |
|---|---|
| Starch—hydroxyethylated | 100 |
| Papermaker's coating clay (predispersed) | 30 |
| Protein—low viscosity soy | 16 |
| Water | 350 |
| Ammonia solution (29.1% ammonia) | 4 |

As in Example 1, the foregoing slurry was cooked at about 190° F. for about 20 minutes. The oil was then added to the extent of 220 parts by weight. The oil was Stoddard solvent. The rough emulsion formed by light mixing during the oil addition was then passed through a Kady mill at the rate of about 10 gallons per minute, and a fine emulsion formed having an oil particle size in the range of about 0.5 to 2.5 microns. The composition had a viscosity of 8,000 centipoises at 40° C. as measured on a Brookfield viscometer at 100 r.p.m. with a No. 6 spindle. The emulsion thickens as in other examples during the passage through the Kady mill. The resultant pH was about 8.8, and the solids content of the composition was 20.4. It will be noted that this composition contained a materially higher proportion of oil by weight and a significantly less quantity of pigment. However, the composition dried readily on the web, in fact, within less than a second in a hot air blast having a temperature of about 350° F. The coating was then supercalendered lightly and had a coat weight per side of about 2 pounds (dry basis). This resulted in a 30-pound finished sheet using the web described in connection with Example 1. The characteristics of the coated sheet are as shown in the table.

It will be noted that, despite the moderate supercalendering, the gloss of this coated sheet was somewhat less than in the preceding examples. However, it is quite suitable for commercial letterpress printing. The shearing stress was about 2,000,000 dynes per square centimeter. It is to be noted that the rheological properties of the emulsion formed in this example are less suitable than the preceding examples, where a greater proportion of pigment to the starch had been employed. The composition is nevertheless suitable for commercial application, particularly with a deversely rotating small diameter rod as in the well known Champflex coater. The letterpress pick resistance value was about 1.0.

It is to be noted that, using soy protein, I have found that approximately 2.3 parts by weight to about 4.6 parts by weight are desirable to emulsify 78 parts by weight of an oil of specific gravity of 0.78. Such ranges achieve oil droplet sizes essentially all of which are in the range of 0.5 to 3.5 microns but the lower protein content yields droplet sizes on the average which are somewhat greater for the noted amount of oil.

*Example 6*

The following illustrates utilization of calcium carbonate as the pigment. The composition was formed by first making a slurry of the following components:

| | Parts by weight |
|---|---|
| Starch—hydroxyethylated | 100 |
| Calcium carbonate | 240 |
| Protein soy | 7 |
| Sodium hexametaphosphate | 9.6 |
| Water | 310 |
| Ammonia solution (29.1% ammonia) | 2.5 |

This slurry was heated at about 190° F. for 20 minutes. Oil in the amount of 130 parts was subsequently added as described in connection with Example 1 and the composition passed through a Kady mill at a rate of 10 gallons per minute. The shearing stress was about 2,500,000 dynes per square centimeter. The resulting composition contained oil droplets in the range of about 0.5 to 2.5 microns, exhibiting a viscosity of 8,000 centipoises under the same conditions as previously described at a pH of 8.6 and a solids content of 44%. The coating composition was applied to a web, dried in a blast of hot air having a temperature of about 350° F. and then lightly supercalendered. The coat weight was approximately 3 pounds per side and the coated sheet exhibited characteristics shown in the table.

*Example 7*

The following illustrates an emulsion coating composition formulation having a relatively low viscosity which accordingly results in the somewhat wider range of oil particle sizes in the emulsion. Initially, the formulation was made up by producing a slurry containing the following constituents:

| | Parts by weight |
|---|---|
| Starch—ethylex gum hydroxyethylated | 180 |
| Papermaker's coating clay (predispersed) | 200 |
| Protein—low viscosity soy | 18.5 |
| Water | 750 |
| Aqueous ammonia solution (29.1% ammonia) | 5 |

This slurry was cooked with live steam in an open kettle at about 190° F. and then oil in the amount of about 312 parts introduced into the hot composition. The rough emulsion, formed by agitating while introducing the oil, was passed, at a temperature of about 150–160° F., to a Kady mill. The shear stress in this instance was about 740,00 dynes per square centimeter. The flow rate was again 10 gallons per minute. The resultant emulsion had a viscosity of about 3,000 centipoises at 40° C. as measured on a Brookfield viscometer with a No. 6 spindle. The pH of the composition was 8.6 and the solids 27.4. The particle size of the emulsion was essentially all in the range of 0.5 to 3.5 microns. The range of oil particle size has a wider spread due to the lesser shearing stress imposed on the emulsion in the Kady mill. Nevertheless the particle size is quite acceptable for commercial purposes. The lower viscosity is due to the larger amount of water employed in the initial slurry. The complete emulsion flowed more readily than the previous compositions and tended to bleed into the web somewhat when applied thereto. The application was again effected by a small diameter reversely rotating rod, and coat weight per side (dry basis) was about 3 pounds. This coated web was supercalendered under the same conditions as in the previous examples, and the characteristics of the finished web are shown in the table.

Despite the somewhat higher solids than in the preceding Example 5, the viscosity in this instance is a borderline situation for commercial production. Nevertheless, the composition dried readily on the web in less than a second in the 350° F. hot air blast. The letterpress pick resistance was 1.0.

While I have referred to the water-immiscible liquid of the emulsion as "oil," it will be understood that substantially any water-immiscible liquid having a lower vapor pressure than that of water, and which does not interact with the coating components to destroy the composition, is useful.

In broad aspect I have discovered that starch may be employed as the major binder constituent of an oil-in-water emulsion and that protein may serve as the emulsifying agent as well as a brightener and as a binder, and particularly as a binder for pigment and starch particles adjacent cell walls if a very considerable mixing action is effected in the emulsification process. I have also found that this intense emulsifying action conditions the protein to avoid a channel complex formation with starch and to provide good pick resistance in the resulting coating composition. Further, important to my finding is that relatively viscous compositions, 8,000 to 12,500 centipoises, together with the starch as the major binder component, leads to good coating holdout on the sheet during drying.

The protein-containing film of coating composition is as easily supercalendered as the compositions of my before-mentioned application. Only the ease of emulsion formation appears to be materially affected by use of protein as the sole emulsifier in place of other agents which do not form channel complexes with the starch.

In general, the useful proportions for letterpress printing paper are somewhat greater than in my copending application. As indicated in FIG. 2, the minimum pigment content based on clay should be 0.25 part by weight per unit weight of binder (90% starch, 10% protein); on the same basis the maximum pigment content is about 2.5 parts by weight. Similarly, for the oil of specific gravity of 0.78 the minimum quantity may be employed when the pigment is high—about 0.8 part by weight—while the maximum oil content at low pigment is 2.6 parts by weight. The water content may vary as discussed hereinbefore and to procure the viscosity applicable to the specific coating device employed. The sodium hexametaphosphate generally need not be employed but aids clay dispersion and is customarily present in predispersed clay; the ammonia is used to solubilize the proteinaceous material and many other such agents may be substituted.

With protein serving as the emulsifying agent, I prefer to employ compositions having a solids content of 20–40% by weight, a viscosity of 8,000–12,500 centipoises (for blade and rod coating), a pigment to binder ratio by weight of about 1:1 and a binder to oil (s.g.—0.78) ratio by weight of about 1:1.6 (FIG. 2). These ratios may vary considerably (as is indicated by FIG. 2) while attaining letterpress paper of good quality. For example, in percentage terms the pigment may constitute about 20% to 72% of the total solids, the binder about 80% to 28% with the protein calculated as binder and the protein being 5% to 15% of the binder. The starch content is then approximately 75% to 23% by weight of the solids. Preferably, the oil (s.g. 0.78) is present (FIG. 2) in greater proportion by weight than the sum of the starch and protein (binder) and at least to about the same extent as the pigment (clay).

The compositions described provide novel coated web products of relatively low basis which exhibit printing characteristics and physical characteristics commonly associated with coated paper of considerably greater basis weight.

The term "consisting essentially of" is used herein in the definition of the elements of the composition to indicate those whose presence in the claimed composition is essential, and as used it is intended to exclude the presence of other materials in such amounts as to interfere substantially with the properties and characteristics possessed by the composition set forth but to permit the presence of other materials in such amounts as not substantially to affect said properties and characteristics adversely.

It will be understood that this invention is susceptible to modification in order to adapt to different usages and conditions and, accordingly, it is desired to comprehend such modifications within the invention as may fall within the scope of the appended claims.

What is claimed is:

1. A stable paper coating composition consisting essentially of
   (a) an aqueous phase containing an essentially nongelling starch and a paper coating pigment dispersed therein;
   (b) an oil phase dispersed in the aqueous phase being immiscible with the aqueous phase and the oil having a lower vapor pressure than that of water;
   (c) and proteinaceous material selected from the group consisting of soy protein, casein, animal glue and soluble blood protein as an emulsifying agent for the oil, said oil being present in the emulsion as fine droplets surrounded by the proteinaceous material, at least 95% of the droplets having a diameter in the range of about 0.5 to 3.5 microns, said proteinaceous material constituting the only essential emulsifying agent of the composition and being present to the extent of between about 5% and 15% by weight of the sum of starch and protein weights, the said composition containing in relative proportions by weight a unit weight of binder and proportions of pigment and oil defined by the area within the long and short dash lines in FIGURE 2.

2. A stable paper coating emulsion composition consisting essentially of
   (a) an aqueous phase containing an essentially nongelling starch and a paper coating pigment dispersed therein;
   (b) an oil phase dispersed in the aqueous phase being immiscible with the aqueous phase and the oil of the oil phase having a lower vapor pressure than that of water;
   (c) and proteinaceous material selected from the group consisting of soy protein, casein, animal glue and soluble blood protein as an emulsifying agent for the oil, said oil being present in the emulsion as fine droplets surrounded by the proteinaceous material, at least 95% of the droplets having a diameter in the range of about 0.5 to 3.5 microns; and
   (d) said pigment constituting about 20% to about 72% by weight of the solids of the composition and the proteinaceous material constituting between about 5% and 15% by weight of the sum of the starch and proteinaceous material weights, said sum of the starch and proteinaceous material weights constituting between about 80% and 28% of the solids of the composition.

3. A stable paper coating composition consisting essentially of a water phase, an oil phase dispersed in the water phase, an essentially nongelling starch and a paper coating pigment dispersed in the water phase, the oil of the oil phase having a lower vapor pressure than water and at least 95% of the oil being in the form of fine droplets having a diameter in the range of about 0.5 to 2.5 microns, and a proteinaceous material selected from the group consisting of soy protein, casein, animal glue and soluble blood protein serving as an emulsifying agent and being present to the extent of between about 5% to 15% by weight of the sum of the starch and protein weights, said proteinaceous material being essentially concentrated at the interface of the aqueous and oil phases and said aqueous phase being otherwise substantially free of the proteinaceous material, said starch constituting between about 23% to about 75% of the composition solids and said pigment constituting between about 72% to 20% of the composition solids and said solids constituting between about 20 to 40% by weight of the composition.

4. An oil-in-water emulsion coating composition consisting essentially of pigment oil having a lower vapor pressure than vapor and essentially nongelling starch and protein as a binder, said protein being selected from the group consisting of soy protein, casein, animal glue and soluble blood protein surrounding droplets of the oil phase and serving as an emulsifying agent, said pigment and oil being present in the relationship defined on a binder weight of units by the formula $$2.32x + y = z$$

wherein $y$ = units of pigment weight having a value between 0.25 and 2.5;

$z$ = a variable of the equation having limits of about 3.8 to about 6.2; and $x$ = weight units of oil based on an oil specific gravity of 0.78 and is dependent on the values selected for $y$ and $z$;

said binder being constituted by between about 5% to 15% by weight of the protein and at least 95% of the said droplets of oil having a diameter in the range of 0.5 to 2.5 microns.

5. A paper coating composition in the form of an oil-in-water emulsion consisting essentially of an aqueous phase and an oil phase in the form of fine oil droplets, at least 95% of said oil droplets having a diameter in the range of 0.5 to 2.5 microns, said oil having a lower vapor pressure than water; protein selected from the group consisting of soy protein, casein, animal glue and soluble blood protein as an emulsifying agent surrounding the oil droplets and being concentrated essentially at the interface of the aqueous and oil phases and said aqueous phase being otherwise substantially free of protein; pigment and an essentially nongelling starch dispersed in the aqueous phase, said starch and protein together constituting a binder for the composition and in which binder the protein is present to the extent of between about 5% to 15% by weight, the said composition containing in relative proportions by weight a unit weight of binder and proportion of pigment and oil defined by the area within the long and short dash lines in FIG. 2.

6. A paper coating composition as claimed in claim 5 and in which the water of the aqueous phase is present to the extent of between about 2.5 to 4 parts by weight of the binder.

7. The process of producing a coating composition which comprises forming an aqueous slurry consisting essentially of: an essentially nongelling starch, protein and paper coating pigment in which the protein is selected from the group consisting of soy protein, casein, animal glue and soluble blood protein present to the extent of about 5% to 15% by weight of the sum of the starch and protein weights, cooking said slurry, adding oil having a lower vapor pressure than that of water to the slurry as the slurry cools, and agitating said slurry sufficiently to produce a disperse oil phase in an aqueous pigment and binder carrying phase such that the size of substantially 95% of the oil droplets are in the range of about 0.5 to 3.5 microns and the droplets are surrounded by the protein and the protein is essentially concentrated at the interface of the aqueous and oil phases and the aqueous phase is otherwise substantially free of protein, said composition containing in relative proportions by weight a unit weight of binder and proportion of pigment and oil defined by the area within the long and short dash lines in FIGURE 2.

8. The process as claimed in claim 7 and in which the step of adding the oil is accompanied by mild agitation to produce a rough emulsion and the step of agitating said slurry is effected by subjecting the slurry to a shearing stress in the range of about 750,000 to 7,500,000 dynes per square centimeter.

9. A process of coating paper in the form of a web which comprises:

(a) applying to the web an aqueous emulsion which consists essentially of an essentially nongelling starch and paper coating pigment in the aqueous phase, an oil of lower vapor pressure than water in the disperse phase in the form of fine oil droplets at least 95% of which are in the range of 0.5 to 3.5 microns, and protein to the extent of between about 5% to 10% by weight of the sum of the starch and protein weights as the only emulsifying agent surrounding the oil droplets said protein being selected from the group consisting of soy protein, casein, animal glue and soluble blood protein and the emulsion having a solids content in the range of about 20 to 40% by weight, the pigment content being substantially about 20 to 72% by weight of the solids content and the starch plus protein 80 to 28% by weight of the said solids content;

(b) drying the wet coated web to first principally eliminate water and, secondly, the oil of lower vapor pressure to produce a coating containing minute light dispersing cells defined by the protein and which protein bonds starch and pigment adjacent the cell walls; and (c) subsequently supercalendering the coated dry web without any substantially destruction of the light dispersing cells.

10. A printing paper web having a dry printable coating composition thereon consisting essentially of pigment to the extent of between about 20% to 80% by weight of the dry coating composition and starch and protein to the extent of 80% to 20% by weight of the coating composition, said protein being present to the extent of about 5% to 15% by weight of the sum of the starch and protein weights, said dry coating composition having a multiplicity of cells which disperse visible light to produce opacity in the coating composition and said cells having walls defined substantially only by the said protein, said protein also serving as a bonding agent for pigment and starch particles adjacent the cells and said light dispersing cells having diameters of between about 0.5 to 3.5 microns.

11. A paper coating composition consisting essentially of:

(a) pigment to the extent of between about 0.25 to 2.5 parts by weight;

(b) oil having a lower vapor pressure than water to the extent of between about 0.8 to 2.6 parts by weight;

(c) a binder component to the extent of about 1 part by weight, said binder component comprising an essentially nongelling starch and about 5% to about 15% by weight of protein based on the binder weight, said protein being selected from the group consisting of soy protein, casein, animal glue and soluble blood protein; and (d) water to the extent of at least about 2.5 parts by weight;

said composition having a viscosity in the range of about 3,000 to 18,000 centipoises and a solids content of between about 20% to 40% by weight, the pigment and starch being present in an aqueous phase and the oil being dispersed in an oil phase as fine droplets, at least 95% of which have a diameter in the range of 0.5 to 3.5 microns, and said protein surrounding said oil droplets as an emulsifying agent and being concentrated at the interface between said aqueous and oil phases, said aqueous phase being otherwise substantially free of said protein.

References Cited

UNITED STATES PATENTS

| | | | |
|---|---|---|---|
| 2,059,343 | 11/1936 | Hadfield | 117—156 |
| 2,360,828 | 10/1944 | Craig | 106—157 |
| 2,759,847 | 8/1956 | Frost et al. | 117—156 |
| 2,776,226 | 1/1957 | Hart | 117—165 |
| 2,900,268 | 8/1959 | Rankin et al. | 106—150 |
| 2,961,334 | 11/1960 | Clancy et al. | 117—156 |
| 3,108,009 | 10/1963 | Clancy et al. | 117—156 |
| 3,157,533 | 11/1964 | Clancy et al. | 117—156 |

ALEXANDER H. BRODMERKEL, *Primary Examiner.*

D. J. ARNOLD, *Assistant Examiner.*